United States Patent [19]

Nützel

[11] Patent Number: 5,086,287
[45] Date of Patent: Feb. 4, 1992

[54] DISPLAY SURFACE FOR TACTILE INFORMATION

[75] Inventor: Wolfgang Nützel, Geroldshausen, Fed. Rep. of Germany

[73] Assignee: KTS Kommunikationstechnik Stolper GmbH, Horb-Nordstetten, Fed. Rep. of Germany

[21] Appl. No.: 445,592

[22] Filed: Dec. 11, 1989

[30] Foreign Application Priority Data

Apr. 11, 1988 [DE] Fed. Rep. of Germany ....... 3812028

[51] Int. Cl.⁵ .............................................. G09B 21/00
[52] U.S. Cl. .................................. 340/407; 434/112; 434/113; 434/115
[58] Field of Search ................ 340/407; 434/112, 113, 434/114–117

[56] References Cited

U.S. PATENT DOCUMENTS

| | | | |
|---|---|---|---|
| 3,987,438 | 10/1976 | Lindenmueller et al. | 340/407 |
| 4,191,945 | 3/1980 | Hannen et al. | 340/407 |
| 4,194,190 | 3/1980 | Bareau | 340/407 |
| 4,715,743 | 12/1987 | Schmanski | 434/112 |
| 4,871,992 | 10/1989 | Petersen | 340/407 |
| 4,898,536 | 2/1990 | Hoffarth | 340/407 |

FOREIGN PATENT DOCUMENTS

| | | |
|---|---|---|
| 0161401 | 11/1985 | European Pat. Off. . |
| 3602355 | 8/1986 | Fed. Rep. of Germany . |
| 2570211 | 3/1986 | France . |

*Primary Examiner*—Donnie L. Crosland
*Attorney, Agent, or Firm*—Dvorak and Traub

[57] ABSTRACT

A display surface for presenting information in tactile form by means of a grid-shaped array of tactile elements. It can be selectively caused to project into the space above the display surface by using lifting elements. According to the invention, there are a number of line slides (8) corresponding to the number of lines of tactile dots, and a number of column slides (3) corresponding to the number of columns of tactile dots. On the line slides a part (9) is allocated to each lifting element (7) in such a way that the lifting element is fixed in the plane of the line, although it is movable in the plane of the column. Similarly on the column slides a part (4) is associated with each lifting element to shift the latter in the plane of the column. In a first step, the position of the tactile elements in each grid line is controlled by shifting the line slide carrying the lifting elements in a direction parallel to the grid line so that all the lifting elements in this line are positioned in such a way that they are engaged by the column slide, which is movably located in the interspaces between the grid columns, while this slide is in its middle position. In a second step, each lifting element is positioned in one of two possible positions (7a, 7b) on the line slide, by moving the associated column slide. Finally, in a third step, the line slide is moved. Depending on their position, the lifting elements are either moved into the space below the tactile elements, thereby raising them (7c), or they move into the spaces alongside the tactile elements without raising them (7b).

22 Claims, 9 Drawing Sheets

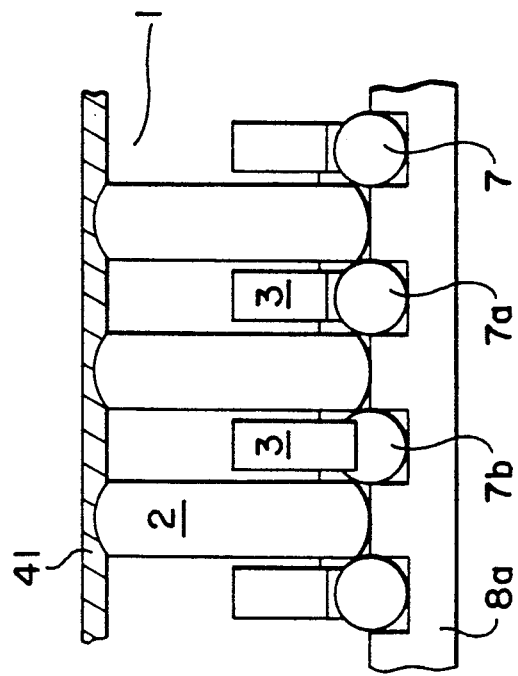
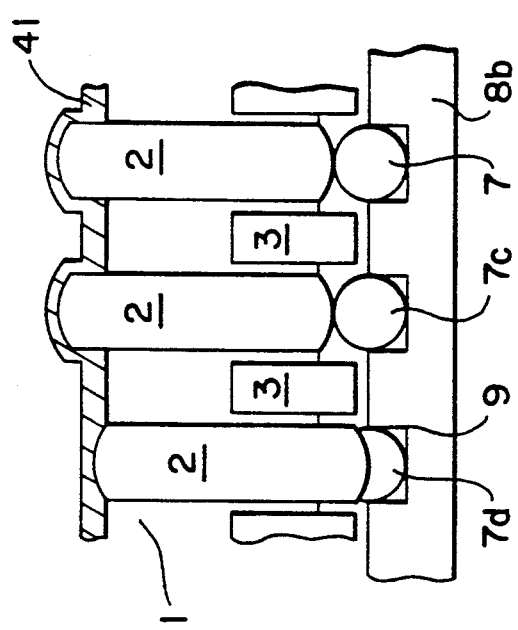

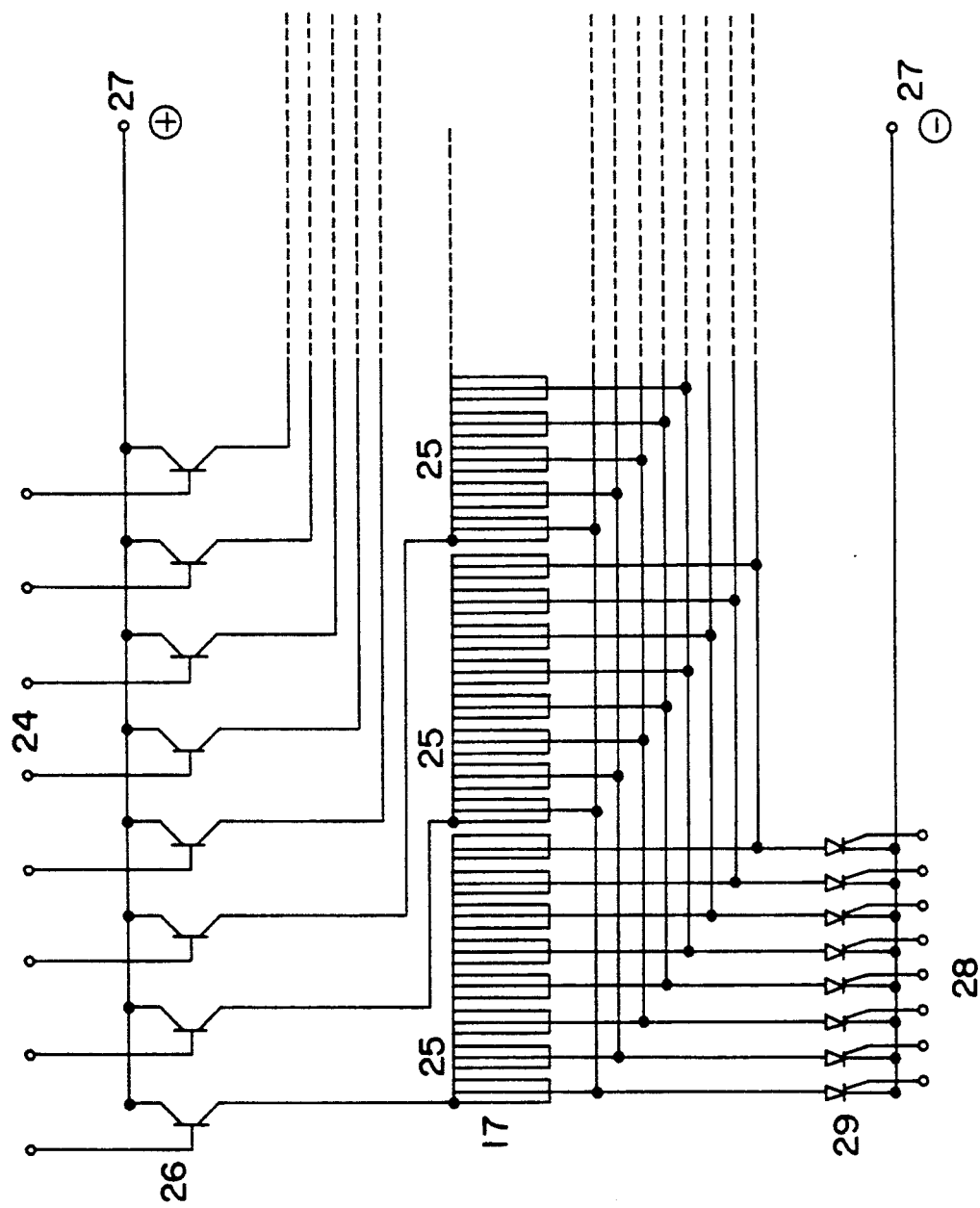

DISPLAY SURFACE FOR TACTILE INFORMATION

The present invention relates to a device for the tactile presentation of information on a display surface. This is achieved through the selective positioning of tactile elements arranged in a grid-shaped pattern.

Braille raised-dot script is the main method of making information available in tactile form to the blind. The characters used in Braille script consist of all the patterns of tactile dots that can be constructed from a 2×3 or 2×4 matrix. Texts of any desired kind can be presented by arranging the characters together in lines. By means of a display surface comprising several lines of Braille it is also possible to convey graphic information. The usual matrix dimension used in this case is 2.5 mm.

Display surfaces are known in which tactile dots arranged in grid-shaped patterns can be selectively moved into the touch-scan position and then be locked in place by electromagnetic means.

European Patent EP-A 0 161 401 describes a display surface in which the upper sections of tactile spheres projecting through openings in a touch-scan surface are used to create the tactile dot symbols. For the purpose of achieving selective positioning each tactile sphere is provided with a spring-loaded locking sphere which is forced underneath the tactile sphere, and against the spring pressure, by means of an armature engaging from below. In order to cancel a tactile dot, the respective armature is retracted, so that the locking sphere moves back into its starting position and the tactile sphere is released. Magnetizing coils combined together into a group are used to move the armatures, and these coils are fitted on an eccentrically driven lifting mechanism slidingly mounted on rails on the underside of the display surface.

In this method it is disadvantageous that a separate, complicatedly shaped armature is required for each tactile dot, because this involves considerable expense when used for a multi-line display. In addition, the sliding and lifting mechanism used to select and operate the armatures is a costly mechanical solution which is susceptible to failure and malfunction. Because of the overall height imposed by the design of the device, fatigue-free operation over long periods of time can be achieved only if the information display is recessed into the work surface, which makes it difficult to use the device at different locations. A further disadvantage comes about from the fact that the exit channels have to be narrowed at the touch-scan surface of the device in order to prevent loss of the tactile spheres. The undercuts present at these locations act as collecting points for the grease which is always present on a person's finger tips and which comes off during the touch-scan process; other foreign bodies can also collect here. The tactile spheres cannot push these deposits to the surface, and as a result the spheres no longer move easily. This limitation of their mobility rapidly gives rise to malfunctions, because the tactile spheres are merely released and are not forcibly returned to their recessed Positions. In contrast to black-on-white lettering, the symbols used in Braille writing do not possess any redundancy, which is why possible malfunctions, particularly in the display of numbers, can be extremely disadvantageous.

It is an object of the present invention to provide a display surface for the presentation of text as well as graphic information in tactile form in which the said surface is simple and thus cheap to manufacture, and operates reliably enough that it can also be used at work places where it is essential that numbers be clearly recognized; also, the overall height of the device should be low enough that a person can work with it for a long time, without suffering fatigue and without it being necessary for the device to be recessed into the working surface. In addition, it should be possible to operate the device in the vertical position so that it can be mounted on a wall where it can serve as a warning and information board with data which can be called up as desired.

To solve this task, the invention proposes an arrangement which can be subdivided into the display unit proper and the drive unit; the latter can be of various design, according to the specified requirement.

In general terms, the present invention provides a display surface for presenting information in tactile form by means of a grid-shaped array of tactile elements which can be selectively caused to project into the space above the display surface by using lifting elements wherein there are a number of line slides corresponding to the number of lines of tactile dots, and a number of column slides corresponding to the number of columns of tactile dots; on the line slides, a part is allocated to each lifting element in such a way that the lifting element is fixed in the plane of the line, although it is movable in the plane of the column, and similarly on the column slides a part is associated with each lifting element to shift the latter in the plane of the column; the position of the tactile elements in each grid line is controlled by, in a first step, shifting the line slide carrying the lifting elements in a direction parallel to the grid line so that all the lifting elements in this line are positioned in such a way that they are engaged by the column slide, which is movably located in the interspaces between the grid columns, while this slide is in its middle position; in a second step, each lifting element is positioned in one of two possible positions, on the line slide, by moving the associated column slide; and in a third step, the line slide is moved and, depending on their position, the lifting elements are either moved into the space below the tactile elements, thereby raising them or they move into the spaces alongside the tactile elements without raising them.

The invention will now be described by way of an exemplary embodiment, with reference to the accompanying diagrammatic drawings, wherein:

FIG. 2 is section parallel to a line slide in the locked position;

FIG. 3 is section parallel to a line slide in the setting position;

FIG. 10 is a diagram of multiplex drive control circuitry for the displacement elements;

Figure 1:
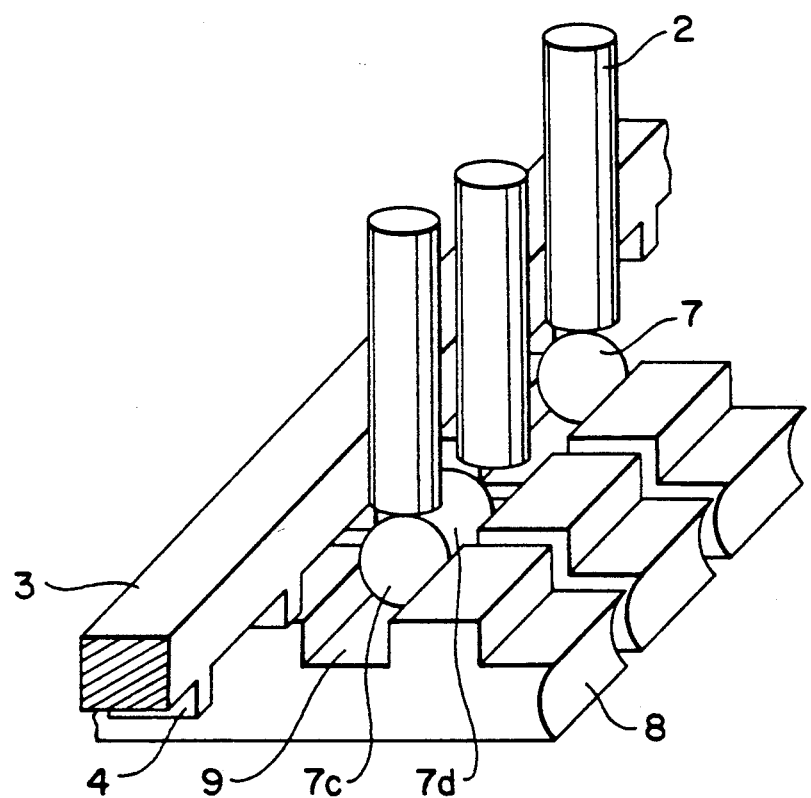
FIG. 1 is a three-dimensional view of a section of a grid column.

The display unit consists of a carrier plate 1 possessing a grid-shaped pattern of boreholes housing the cylindrical pins 2 which serve as the tactile elements. On the underside of the carrier plate 1, grooves are provided in the spaces between the columns of tactile elements to permit the sliding displacement of strip-shaped column slides 3. The shape of the groove and the cross section of the slides are advantageously selected in such a manner that the slides are held in position parallel to the thickness of the carrier plate.

On their free edge, the column slides 3 are fitted with transverse teeth 4 which engage the lifting elements; the height of these teeth is preferably about half that of the lifting elements, and the tooth spacing is preferentially about twice the width of each lifting element.

Parallel to the orientation of the horizontal grid lines, the underside of the carrier plate possesses channels 5, 6 along the lines of the grid boreholes and also along the lines of the spaces between the grid boreholes; these channels are used to fix the position of the lifting elements 7 in each of the two possible locking positions 7c and 7d. The lifting elements 7 take the form preferentially of spheres, although many other different shapes such as wedges or discs may also be used. The channel cross section 5, 6 corresponds to the upper part of the lifting element cross section. Each tactile element is associated with a lifting element, and all lifting elements per horizontal grid line are slidingly mounted in transverse channels 9 on a line slide 8 in such a manner that they can be selectively positioned in the plane of the grid lines 7b or of the grid line interspaces 7a. By displacing each line slide, all the lifting elements of one particular grid line an be shifted together into the plane of the grid columns, as shown in FIG. 2, or into the plane of the spaces between the grid columns, as shown in FIG. 3.

Thus, each lifting element can occupy four different positions 7a to 7d, whose functions are described on the basis of FIGS. 2 to 5.

Figure 5:
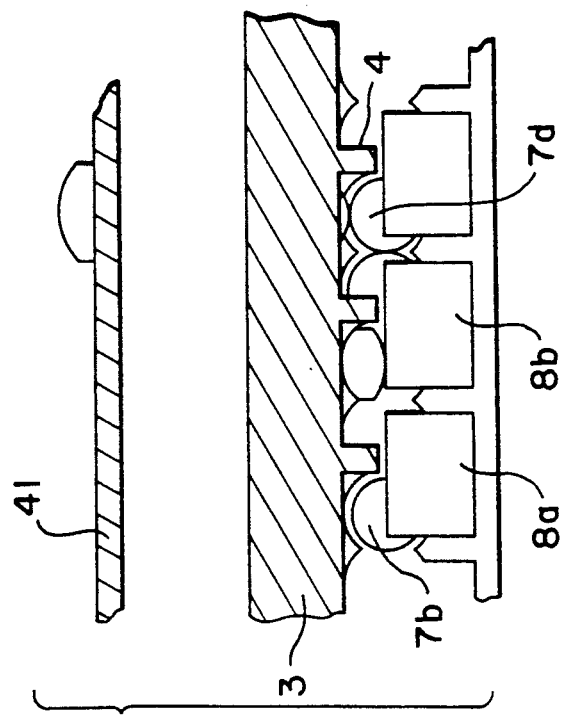
FIG. 5 is section perpendicular to the line slides in the plane of a column slide.
Figure 4:
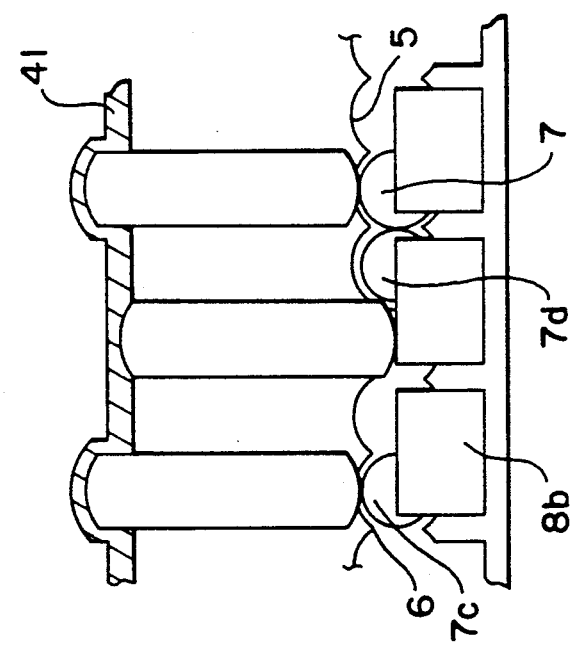
FIG. 4 is section perpendicular to the line slides in the plane of a column slide.

When the line slide 8 is in its setting position 8a, as shown in FIGS. 3 and 5, the lifting element in the interspace between the grid columns is engaged by the column slide 3 and can be displaced by the latter into the plane of the grid line 7b in order to prepare for the lifting of a tactile element, or it can be displaced into the plane of the interspace between the grid lines 7a in order to prevent the tactile element from being lifted.

In the position of the line slide 8 which is identified as the locking position 8b, the lifting element 7 is either located under and lifts (7c) the associated tactile element 2, or it is located in the interspace alongside the associated tactile element without lifting it (7d).

The two lifting element positions 7c and 7d in the locking position 8b are stabilized by the guide channels 5 and 6, i.e. the position can be changed only via the setting position 8a.

The information content of the display is in each case simultaneously changed for all the tactile dots in a grid line, and several grid lines with the same information content can be jointly adjusted, by means of the following four steps:

In the first step, all the column slides are brought to the middle setting;

In the second step, the grid line content is cancelled by moving the corresponding line slide into the setting position;

In the third step, the lifting elements are positioned by means of the column slides, and In the fourth step, the line slide is moved into the setting position and, depending on the previous setting of the lifting element, the tactile elements are raised by having the lifting element forced beneath them, or they are left in their recessed position.

The return of the tactile elements to the recessed position can be achieved either by the action of gravity and the touch-scanning finger, or by means of a spring element which simultaneously prevents the tactile dots from being lost.

Advantageously, this spring element is formed by a rubber membrane 9 on the touch-scan surface of the device; this rubber membrane simultaneously prevents the build-up of dirt deposits which can cause malfunctions, between the tactile elements and the carrier plate. In order to achieve optimum strength, spring restoring force and tactile impression, this rubber membrane is thinner over the tactile dots than in the interspaces between these dots.

The time required to present new information on the display surface can be shortened by carrying out steps one and two of the setting process jointly for all the grid lines which have to be re-written.

Depending on the requirement for speed and manner of re-writing the display surface, as well as on the costs of the drive unit for the line slides, column slides and their controls, preferentially one of the following operating modes can be used:

a) Simultaneous erasing of freely selectable grid lines, followed by line-by-line re-writing.

b) Simultaneous erasing of grid lines in pre-determined groups, or erasing of all grid lines, followed by line-by-line re-writing.

c) Erasing of one or more freely selectable grid lines, followed by immediate re-writing of all erased lines with identical content.

d) Erasing of in each case one grid line in a pre-determined sequence, followed by immediate re-writing.

| Table showing certain characteristics of the various operating modes | | | | |
|---|---|---|---|---|
| Operating mode | a) | b) | c) | d) |
| Control system costs | high | low | moderate | low |
| Free access to any grid line | yes | no | yes | no |
| Speed of partial re-writing | maximum | moderate | high | low |
| Remainder of display influenced during partial re-writing | no | yes | no | yes |

Figure 6:
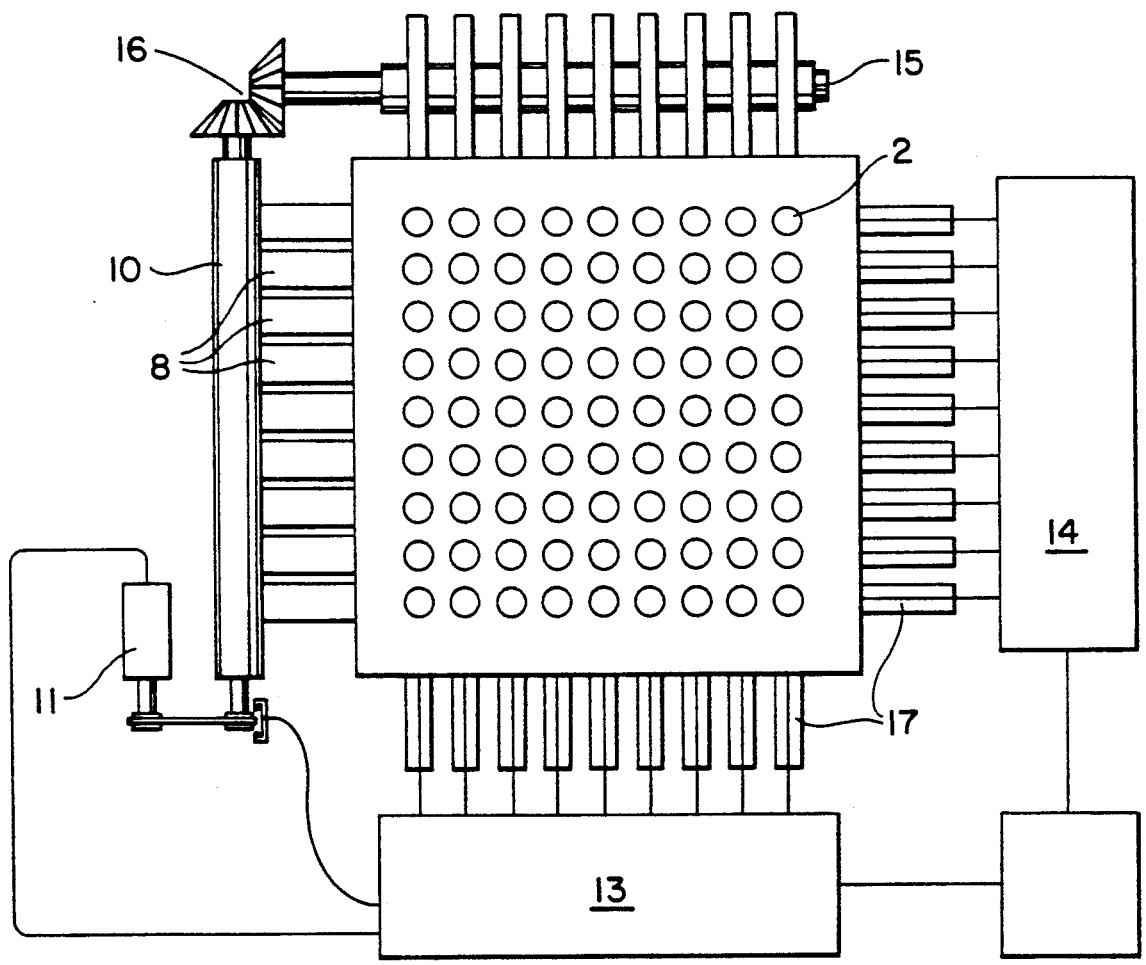
FIG. 6 is a representation of touch-scan surface with drive and control systems.

The travel distance of the line slide is equal to about half the distance between the grid columns, while that of the column slide is smaller than the distance between the grid lines. These slides can be driven by various devices, which are described in the following; the ultimate choice depends on the desired operating mode of the device. FIG. 6 illustrates a particularly simple drive which is suitable for operating mode c).

When many tactile elements in one or more grid lines need to be raised, and particularly when they are being depressed by a touch-scanning finger, a relatively large amount of force is required to move the line slides 8 into the locking position; this force is provided by the camshaft 10 which is in turn driven by an electric motor 11. A pulse generator 12 reports the angular position of the camshaft 11 to the control electronics 13 and 14. A second camshaft 15 is coupled in phase-locked manner via a gearing 16 to the rotation of the camshaft 10. The purpose of the second camshaft is to move all column slides 3 together into the middle setting.

Figure 7:
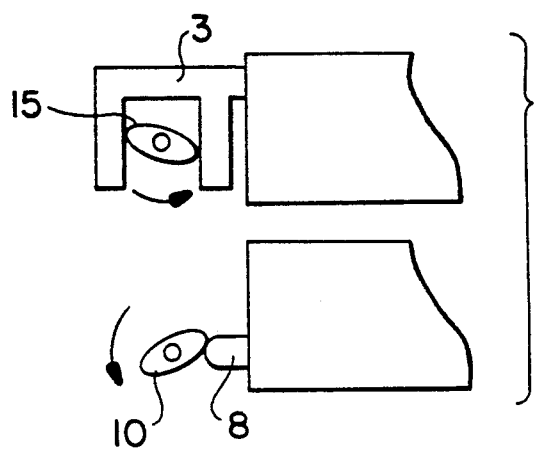
FIG. 7 is a diagrammatic representation of phase relationship of the camshafts with the line slides in the locked position.
Figure 8:
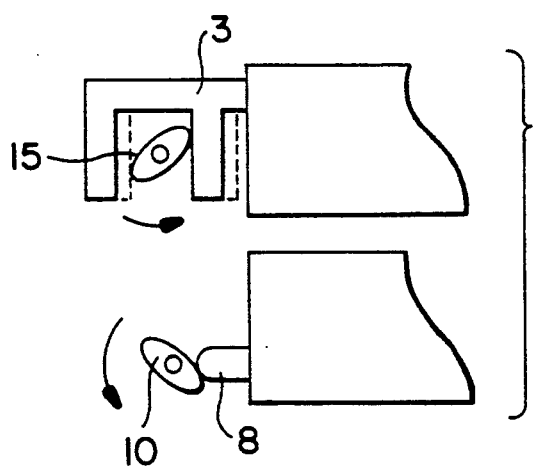
FIG. 8 is a representation similar to that of FIG. 7 but showing phase relationship of the camshafts with the line slides in the setting position.

The cross sections of the two camshafts, and their opposing phase positions, are selected in such a manner that the column slides are always moved to their middle position when the line slides 8 are released by the camshaft 10 so that they an be moved back to the setting position (FIG. 7); also, the column slides 3 are released from their middle position before the camshaft 10 moves the line slide 8 back to the looking position (FIG. 8).

Figure 9:
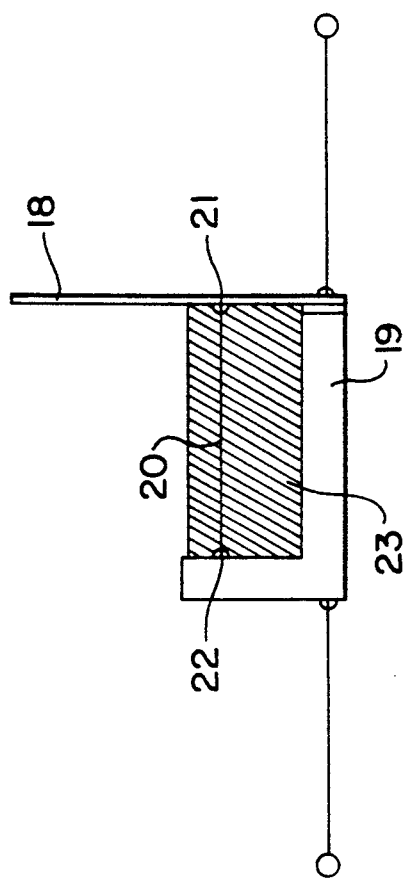
FIG. 9 is a section through a displacement element.

Optional, selective movement of the line and column guides is achieved by a displacement device 17 associated with each slide, and its method of action is described on the basis of FIG. 9.

A strip-shaped spring element 18 is attached in an electrically insulated manner to one side of a metal supporting section 19. The wire 20 is attached in a mechanically strong and electrically conducting manner at point 21 to the spring element 18. The other end of the wire is attached in an electrically conducting manner to the opposite side of the supporting section 19 at point 22.

The wire 20 is made from a known type of "shape memory alloy" composed preferentially of nickel and titanium.

When heated above a threshold temperature, which varies within wide limits depending on the composition Of the alloy, the wire undergoes a reversible contraction in length of typically up to 5% of its overall length. The useful tensile force generated in the process is typically 200 N/mm2.

Heating of the wire above the threshold temperature is accomplished by means of the thermal effect of an electric current supplied via the supporting profile 19 and the spring element 18 and flowing through the wire.

The thickness of the wire is selected so that it exerts adequate tensile force and the thermal inertia is matched to the desired speed of re-writing of the display surface, which is essentially determined by the time taken to cool to below the threshold temperature. This time can be considerably shortened by embedding the wire in a material having good thermal conductivity. This is the purpose served by the filler material 23, e.g. silicone rubber, which conducts the heat away through the surface of the supporting section 19.

The length of the wire is selected according to the desired degree of shortening.

Another way to match the dimensions of the wire to the required displacement force and the desired displacement travel is to use a mechanical transmission system, whose size is determined in the described embodiment of the invention by the position of the attachment point 21 of the wire 20 on the spring element 18.

The electrical pulses required to drive the displacement devices 17 are provided by an electronic control unit 13 and 14 of known type. In order to keep the cost to a minimum, the drive is advantageously accomplished by multiplexing, which is an easy matter in view of the thermal inertia of the wires, and it can be advantageously influenced by making an appropriate selection of the filler material 23.

The displacement elements 17 are for example combined together into 8 groups 25 in FIG. 10, each containing 8 elements. Via the control inputs 24, one group 25 after another is selected and connected via the associated transistor 26 to the voltage supply 27. Then, via control inputs 28, the thyristors 29 whose associated displacement elements 17 need to be activated are energized. Before the changeover is made via one of the control inputs 24 to the next group 25, there is a short pause in the pulse output to permit all thyristors 29 to reset.

The control signal from the angular position indicator 11 is used to synchronize the rotation of the camshafts 10 and 15 with the drive 13 and 14 of the displacement elements 17.

In order to reduce the electrical drive requirements, advantageously a slidable setting device for moving a slide or a group of slides is provided in the case of display surfaces having low requirements as regards re-writing rate or impairment of reading during re-writing, which is mainly the case for operating modes b) and d).

In order to permit freely selectable access to the grid lines, or to actuate the column slides, the setting device possesses an active, preferably electrically controllable drive. However, a particularly simple embodiment of the invention is proposed in which a passively acting spring element is provided to drive the setting device; this embodiment is used in particular when it is desired to access the grid lines in a pre-determined sequence.

The setting device is moved by means of its own drive, preferably a stepping motor, or by the already present camshaft drive system, acting through gearing. If necessary, a known type of electronic control synchronizes the movements of the setting device, while incorporating the signals from the pulse generator 12 which records the angular position of the camshafts.

Figure 13:
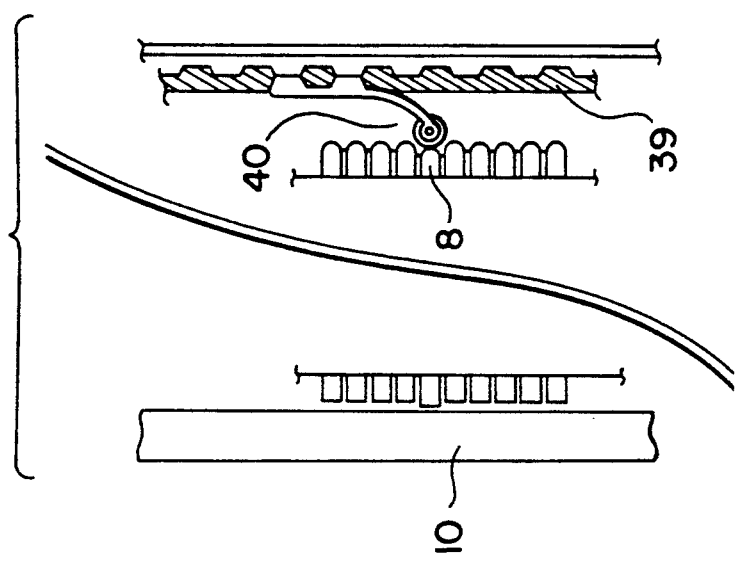
FIG. 13 shows displaceable setting device, passively actuated by a spring.
Figure 11:
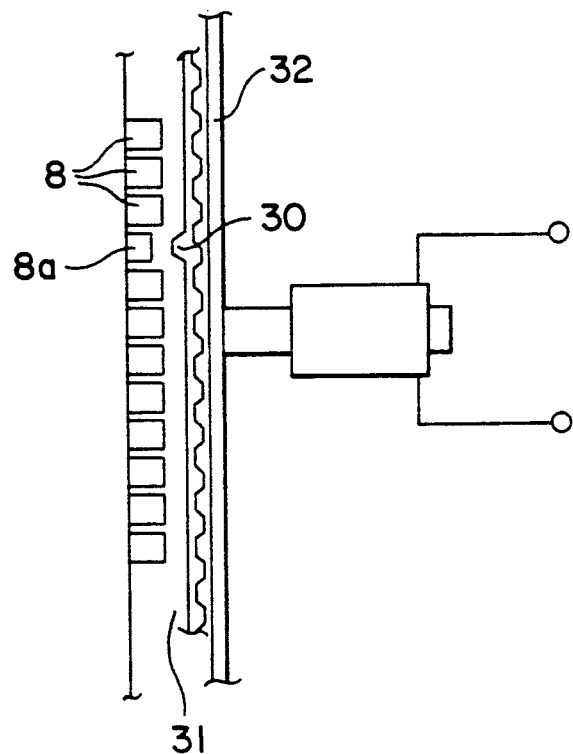
FIG. 11 shows displaceable setting device with cam.

Three advantageous embodiments of the invention are described on the basis of FIGS. 11 and 13.

In FIG. 11 the setting device consists of a cam 30 which is mounted on an internally toothed belt 31 and can be displaced transversely to the slides 8. In order to position a selected slide 8, the electromagnetically driven displacement device 32 moves the cam 30 against the slide 80 and displaces it.

Figure 12:
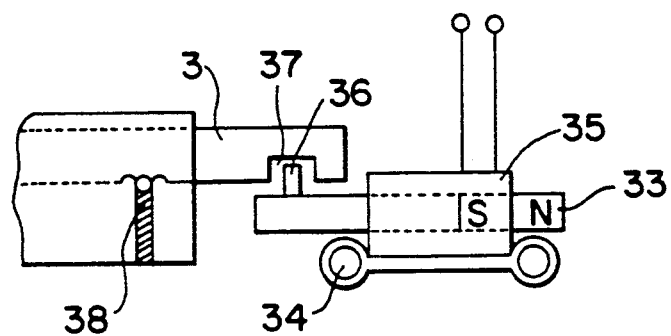
FIG. 12 shows displaceable setting device for two directions of movement.
Figure 14A:
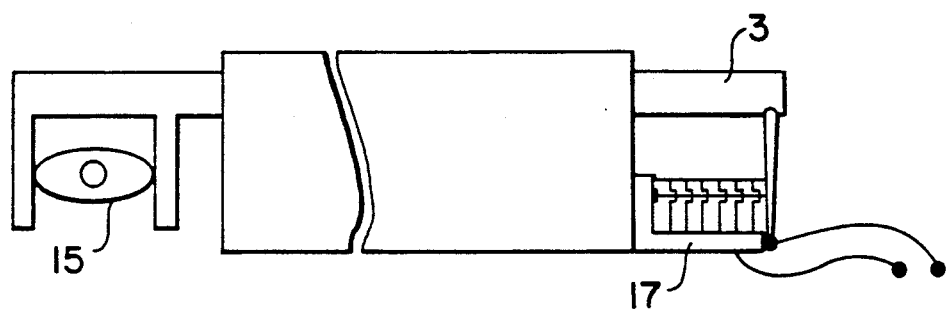
FIG. 14a and FIG. 14b show a displacement device fitted to column and line sliders.
Figure 14B:
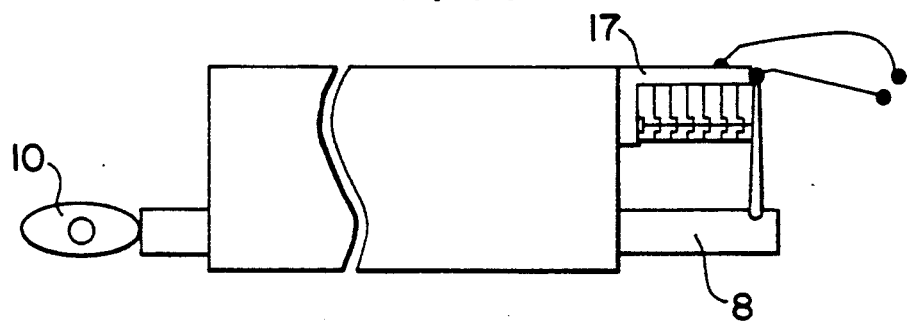

In FIG. 12, the permanent-magnet armature 33 of an electromagnet 35, which is movably mounted on a spindle 34, engages with pin 36 in the grooves 37 of the slides 3, while the latter are located in their middle position; this permits the associated slide to be shifted into either of its two end positions. The locking device 38 with which each slide is equipped stabilizes the three possible slide positions.

FIG. 13 depicts a particularly simple embodiment of the invention. The spring-mounted roller 40 attached to a rotating belt 39 displaces its associated slide 8 whenever the latter is released by the cam 10 moving it in the opposite direction.

In conclusion, it should be pointed out that the devices described here for actuating the control slides as well as the line slides may also be advantageously combined together in other ways which are not explicitly presented here. In addition, each slide can be equipped with a direct drive, of a known state of the art type, such as an electromagnet, a pneumatic drive, an hydraulic drive, or similar.

Those skilled in the art will appreciate that other embodiments of the device can be devised which may differ from the described embodiments without departing from the scope of the present invention.

Accordingly, I wish to protect by letters patent which may issue on the present application all such embodiments as properly fall within the scope of my contribution to the art.

The embodiments of the invention in which an exclusive right or privilege is claimed are defined as follows:

1. A display surface for presenting information in tactile form by means of tactile elements arranged in lines and columns to form a grid-shaped array comprising lifting elements for selectively causing the tactile to project into a space above the display surface further comprising tactile dots arranged in corresponding lines and columns, a number of slides, referred to as line slides, corresponding to the number of lines of the tactile dots and a number of slides, referred to as column slides, corresponding to the number of the columns of the tactile dots; on the line slides, a portion is allocated to each lifting element in such a way that the lifting element is fixed in a plane comprising the line and the tactile elements arranged along this line, whereas the lifting elements is movable in the plane of the column, and similarly on the column slides a portion is associated with each lifting element to shift the latter in the plane of the column; the position of the tactile elements in each grid line is controlled by, in a first step, shifting the line slide carrying the lifting elements in a direction parallel to the grid line so that all the lifting elements in this line are positioned in such a way that they are engaged by the column slide, which is movably located in the interspaces between the grid columns, when this slide is in a middle position; in a second step, each lifting element is positioned in one of two possible positions on the line slide, by shifting the associated column slide; and in a third step, the line slide is shifted and, depending on the position of the lifting elements, they are either shifted into the space below the tactile elements, thereby raising them or they shift into spaces alongside the tactile elements without raising them.

2. A display surface according to claim 1, wherein a rubber membrane covering the cylindrical pins which form the tactile dots causes the cylindrical pins to return to their recessed position and retains them within the display.

3. A display surface according to claim 2, wherein a rubber membrane over the tactile dots is thinner than in the interspaces between the tactile dots.

4. A display surface according to claim 1, wherein the movement of the column slides and of the line slides is achieved by coupled actuating devices in such a manner that the displacement of at least one line slide into a setting position is preceded by the shifting of all the column slides into the middle position, and also the shifting of at least one line slide into a locked position is preceded by the shifting of the column slides as desired into one of the two end positions.

5. A display surface according to claim 4, wherein a camshaft is provided for the actuating devices of the line slides and for those of the column slides, and the movement of these camshafts is phase-looked via a non-slip drive.

6. A display surface according to claims 4, wherein the drive for the actuating devices is provided by an electric motor.

7. A display surface according to claim 4, wherein an electric signal generator indicates the position of the actuating device.

8. A display surface according to; claim 1, wherein the selective displacement Of the line and/or column slides is accomplished by the reversible change in shape or length occurring when a wire made from an alloy known as a "shape memory alloy" is heated up.

9. A display surface according to claim 6, wherein the heating is caused by an electric current flowing through the wire.

10. A display surface according to claim 8, wherein in order to increase the speed of operation, the wire is embedded in a material having good thermal conductivity.

11. A display surface according to claims 8, wherein the extent of movement generated by the wire is magnified by a simple mechanical transmission, e.g. in the form of a lever.

12. A display surface according to claim 11, wherein the lever has the form of a spring element.

13. A display surface according to claim 8, wherein all the wires are electrically energized by a multiplex process.

14. A display surface according to claim 1, wherein a selective displacement of the line and/or column slides is accomplished in such a manner that by moving a coupling element transversely to the slides the movement of an actuating device allocated to the slides is transmitted selectively to in each case one slide.

15. A display surface according to claim 14, wherein at least one coupling element is arranged on a recirculating internally toothed belt.

16. A display surface according to claim 1, wherein the selective movement of the column and/or line slides is accomplished by a setting device which is transversely displaceable relative to the slides, and this device engages successively with its coupling element in a corresponding recess provided on each slide, and transmits a setting movement to in each case one slide.

17. A display surface according to claim 1, wherein the selective displacement of the line slides is accomplished in that a spring-loaded cam, which is transversely movable in relation to the slides, is positioned via a drive in such a way that the spring force is transmitted exactly to an associated slide during the phase when the line slides are no longer fixed in the locked position.

18. A display surface according to claim 14, wherein the displacement device is driven transverse to the slides by a stepping motor.

19. A display surface according to claim 14, wherein the drive of the displacement device transverse to the slides is coupled in a phase-looked manner with the drive of the actuating devices of the column of line slides via a non-slip gearing.

20. A display surface for presenting information in tactile form by means of tactile elements arranged in lines and columns to form a grid-shaped array comprising lifting elements which are positioned below the tactile elements for selectively causing the tactile elements to project into the space above the display surface by means of a number of line slides corresponding to the number of lines of tactile dots, and a number of column slides corresponding to the number of columns of tactile dots; on the line slides a portion is allocated to each lifting element in such a way that the lifting element is fixed in the direction of the line, although it is movable in the direction of the column, and similarly on the column slides a part is associated with each lifting element to shift the latter in the direction of the column.

21. A display surface according to claim 20, in which said portion on the line slides is formed by a recess therein, whereas said portion on the column slides is formed by a protrusion on the underside thereof.

22. A method of operating a display as claimed in claim 1, characterized in that the position of the tactile elements in each grid line is controlled by, in a first step, shifting the line slide carrying the lifting elements in a direction parallel to the grid line so that all the lifting elements in this line are positioned in such a way that they are engaged by the column slide, which is movably located in the interspaces between the grid columns, while this slide is in its middle position; in a second step, each lifting element is positioned in one of two possible positions on the line slide, by moving the associated column slide; and in a third step, the line slide is moved and, depending on their position, the lifting elements are either moved into the space below the tactile elements, thereby raising them, or they move into the spaces alongside the tactile elements without raising them.

* * * * *